US008831751B2

(12) United States Patent
Vasko et al.

(10) Patent No.: US 8,831,751 B2
(45) Date of Patent: *Sep. 9, 2014

(54) AUTOMATICALLY ADJUSTABLE INDUSTRIAL CONTROL CONFIGURATION

(75) Inventors: David A. Vasko, Solon, OH (US); Raymond J. Staron, Chagrin Falls, OH (US); Charles Martin Rischar, Chardon, OH (US); Kenwood H. Hall, Hudson, OH (US); Subbian Govindaraj, Solon, OH (US); Robert J. Kretschmann, Bay Village, OH (US); Michael D. Kalan, Highland Heights, OH (US); Paul R. D'Mura, Glendale, AZ (US); Taryl J. Jasper, South Euclid, OH (US); Eugene Liberman, Rocky River, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,653

(22) Filed: Jul. 9, 2012

(65) Prior Publication Data

US 2012/0323344 A1 Dec. 20, 2012

Related U.S. Application Data

(63) Continuation of application No. 12/233,842, filed on Sep. 19, 2008, now Pat. No. 8,229,575.

(51) Int. Cl.
*G06F 19/00* (2011.01)
(52) U.S. Cl.
USPC .................................. 700/1; 700/28; 709/224

(58) Field of Classification Search
USPC .......... 700/28–31, 81, 1, 2, 83; 709/223, 224; 717/105, 109, 126
See application file for complete search history.

(56) References Cited

U.S. PATENT DOCUMENTS

| 5,539,975 | A | 7/1996 | Kukuljan et al. |
|---|---|---|---|
| 5,909,368 | A | 6/1999 | Nixon et al. |
| 5,978,753 | A | 11/1999 | Eidson |
| 5,980,078 | A | 11/1999 | Krivoshein et al. |
| 6,167,457 | A | 12/2000 | Eidson et al. |
| 6,459,944 | B1 * | 10/2002 | Maturana et al. ............. 700/100 |
| 6,466,827 | B1 * | 10/2002 | Stine ................................ 700/18 |
| 7,089,530 | B1 | 8/2006 | Dardinski et al. |
| 7,120,558 | B2 | 10/2006 | McIntyre et al. |
| 7,171,281 | B2 | 1/2007 | Weber et al. |
| 7,480,709 | B2 | 1/2009 | Callaghan |
| 7,650,607 | B2 | 1/2010 | Resnick et al. |
| 7,831,410 | B2 | 11/2010 | McIntyre et al. |
| 7,848,829 | B2 | 12/2010 | Nixon et al. |

(Continued)

OTHER PUBLICATIONS

OA dated Sep. 15, 2011 for U.S. Appl. No. 12/233,842, 23 pages.

(Continued)

*Primary Examiner* — Kidest Bahta
(74) *Attorney, Agent, or Firm* — Amin, Turocy & Watson, LLP

(57) ABSTRACT

An industrial control configuration can be a dynamic entity where different controllers are added, are subtracted, fail, etc. When dynamic functions occur, bindings of the configuration can benefit from a modification. Therefore, automatic adjustment of bindings can occur to facilitate improved operation. Automatic adjustment can be practiced when the industrial control configuration is a distributed control configuration without reliance upon a central database.

20 Claims, 10 Drawing Sheets

(56) References Cited

U.S. PATENT DOCUMENTS

| | | |
|---|---|---|
| 2002/0099814 A1 | 7/2002 | Mastrianni |
| 2004/0039468 A1 | 2/2004 | Zahorack et al. |
| 2006/0009861 A1 | 1/2006 | Bonasia et al. |
| 2006/0150172 A1 | 7/2006 | Heath et al. |
| 2006/0253554 A1 | 11/2006 | Uwais |
| 2008/0057872 A1 | 3/2008 | McFarland et al. |
| 2008/0147207 A1 | 6/2008 | D'Mura et al. |
| 2009/0217200 A1 | 8/2009 | Hammack et al. |
| 2011/0035037 A1 | 2/2011 | Weber et al. |

OTHER PUBLICATIONS

OA dated Mar. 31, 2011 for U.S. Appl. No. 12/233,842, 27 pages.
Notice of Allowance dated Mar. 20, 2012 for U.S. Appl. No. 12/233,842, 34 pages.

* cited by examiner

AUTOMATICALLY ADJUSTABLE INDUSTRIAL CONTROL CONFIGURATION

CROSS-REFERENCE TO RELATED APPLICATIONS

This application is a continuation application of, and claims priority to, U.S. patent application Ser. No. 12/233,842, entitled "AUTOMATICALLY ADJUSTABLE INDUSTRIAL CONTROL CONFIGURATION," filed on Sep. 19, 2008 now U.S. Pat. No. 8,229,575, the entirety of which is incorporated herein by reference.

TECHNICAL FIELD

The subject specification relates generally to an industrial control configuration and in particular to being able to modify the configuration automatically when appropriate.

BACKGROUND

Industrial control environments can typically involve complex mechanical, electronic, electro-mechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, for instance (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

An industrial control configuration can include a number of different components to complete a specific process. Commonly, these configurations are organic in nature such that different components are added or removed depending on objectives of the process. For instance, as new technology is developed, older and outdated components can be removed and replaced with more efficient and modern equivalent components.

With the disclosed innovation, bindings among components (e.g., controllers) can be automatically adjusted based upon available resources. If a new component enters the configuration, bindings can be created with the new component and redundant bindings and/or outdated bindings can be eliminated. Likewise, if a component is removed or a component operates at least partially in failure, then the innovation can automatically compensate for lost functionality by modifying bindings.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
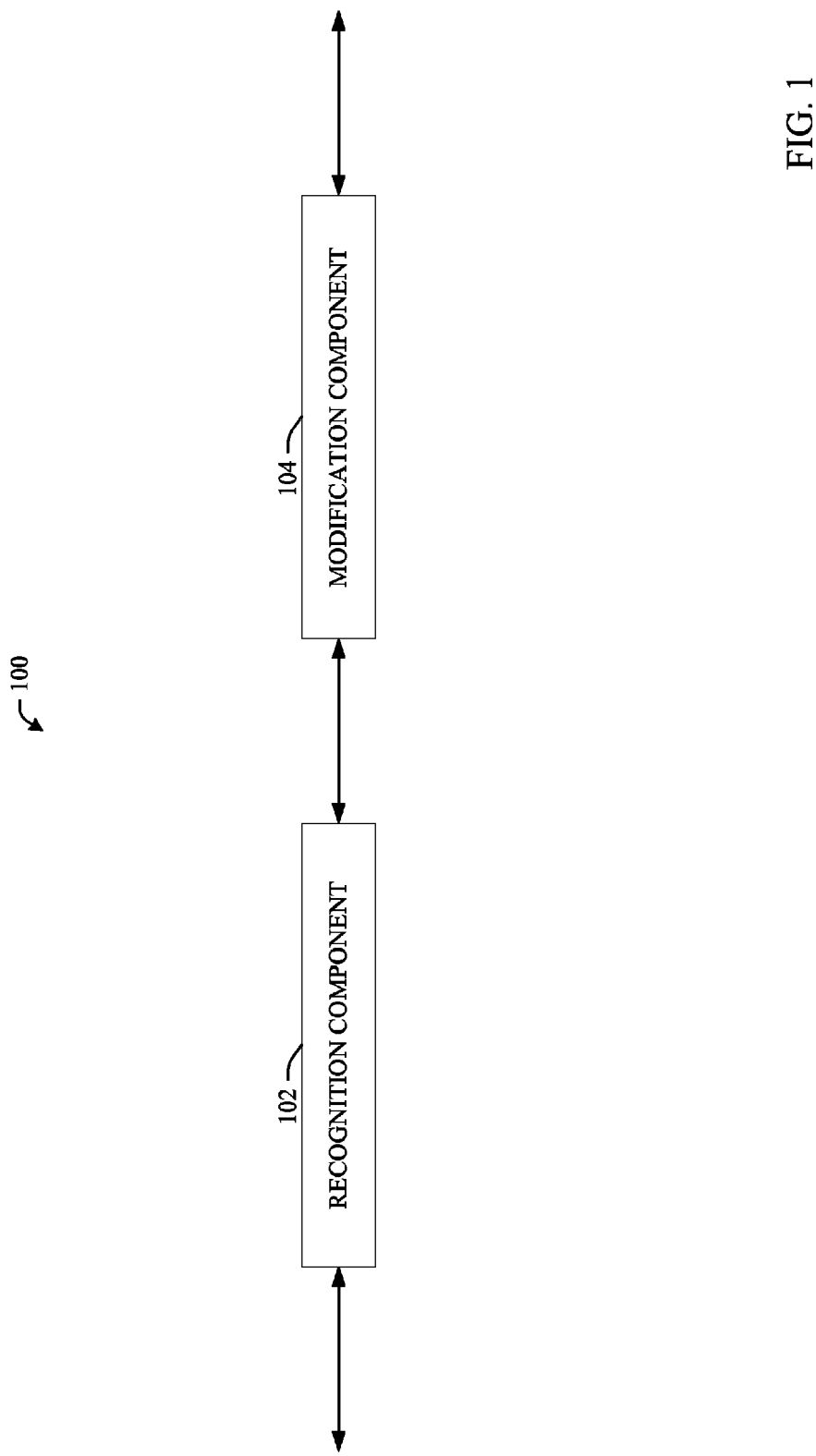
FIG. 1 illustrates a representative system for automatic binding adaptation in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Now referring to FIG. 1, an example system 100 is disclosed for adjusting bindings in an industrial control configuration (hereafter referred to as configuration). A configuration commonly includes a number of components designed to perform a specific task. For example, holding tanks, measurers, mixers, and packagers can link together to perform a process, such as making soda. In addition, a number of controllers, software modules, and the like can be included to manage operation of the process. Different entities can bind with one another, such that information can be shared, dependencies can be formed, etc.

However, it is possible that the process can change after construction and/or implementation. For example, initially the process can package virtually all contents into 16-ounce bottles. As demands change, there can be a desire to add a capability of packaging a portion of the soda in 12-ounce aluminum cans. To achieve this desire, new components can be added, other components can be removed, component functionality can be altered, and the like. Based on the change to the configuration, it can be beneficial (e.g., necessary for proper operation) for bindings among the component to be changed. Additionally, a failure can occur in the process (e.g., one of multiple soda water dispensers malfunctions) that can be a basis for alteration of bindings of the configuration.

The system 100 can use a recognition component 102 that identifies a change in the industrial control configuration. According to one embodiment, the change is an addition of a controller, removal of a controller, failure of a controller, adjustment of controller operation (e.g., a user reprograms a controller to change functionality), or a combination thereof. In addition, the recognition component 102 can passively monitor the configuration to detect a change as well as monitor individual controllers for changes and require newly entering controllers to identify itself to the recognition component 102.

A modification component 104 can automatically alter at least one binding based upon the identified change. Analysis of the changed configuration can occur and a determination can be made on how bindings should be changed. Based upon a result of the analysis, the modification component 104 can change at least one configuration binding. Automatic alteration of the binding can include deletion of the binding, creation of the binding, adjustment of the binding (e.g., a binding connected to 'controller a' and 'controller b' is moved such that it connects to 'controller a' and 'controller c'), or a combination thereof.

According to one embodiment, aspects disclosed herein can operate in a different manner than intelligent agents. With an intelligent agent system, metadata, capabilities, can be stored in a directory. When it is appropriate to reconfigure components can be discovered which satisfy desires based on registered capabilities. For agents this is a dynamic process and components can be found on a per batch or product basis. In contrast, the system 100 can operate in a steady state and is reconfigured when a change is detected. For agents, there commonly is no steady state and each operation is completed using the capabilities of the components available.

Figure 2:
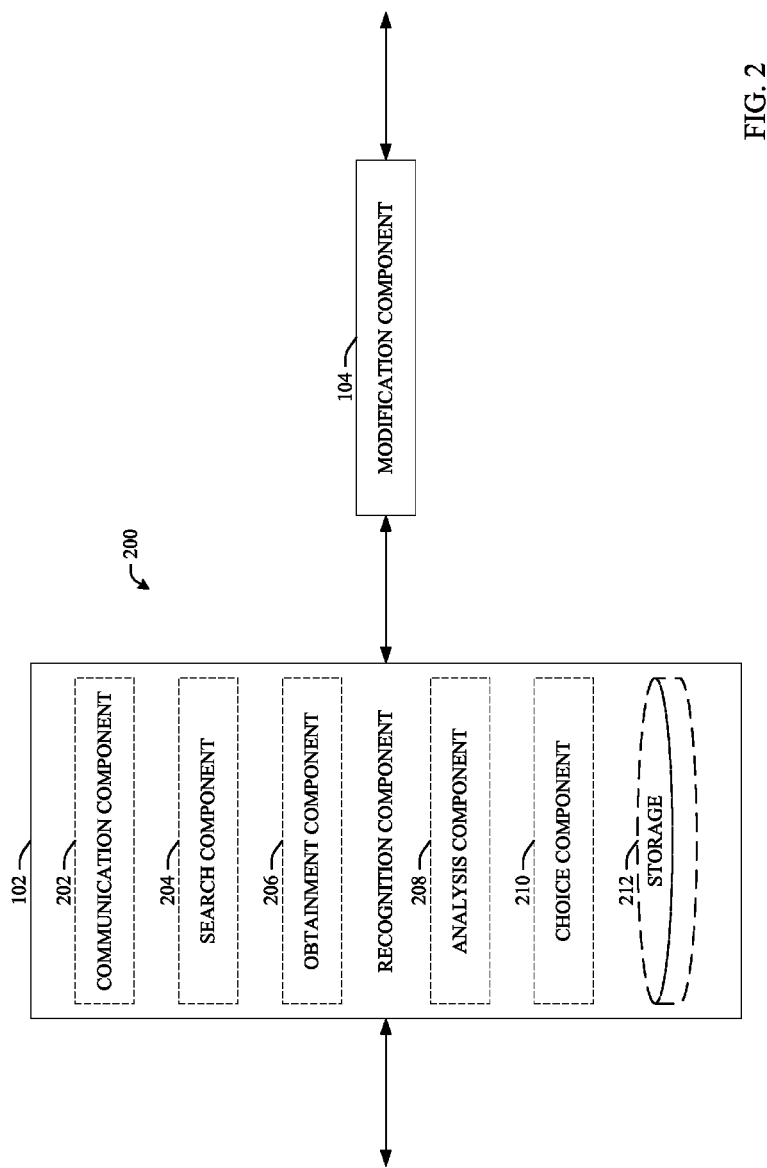
FIG. 2 illustrates a representative system for automatic binding adaptation in accordance disclosing a detailed recognition component in accordance with an aspect of the subject specification.

Now referring to FIG. 2, an example system 200 is disclosed for altering bindings based upon a change in a configuration with a detailed recognition component 102 that can identify a change in the configuration. To facilitate operation, the recognition component 102 can use a communication component 202 that can engage with other devices to transfer information, such as to send a request for metadata, receiving metadata from an auxiliary source, etc. This metadata could include the capabilities of the various devices and these capabilities could then be matched with desired functionality to form the new bindings. Operation can take place wirelessly, in a hard-wired manner, employment of security technology (e.g., encryption), etc. Additionally, metadata transfer can be active (e.g., query/response) or passive (e.g., monitoring of public communication signals). Moreover, the communication component 202 can use various protective features, such as performing a virus scan on collected metadata and avoid usage of metadata that is positive for a virus.

A search component 204 can discover information sources that are part of the configuration as well as auxiliary sources. For example, when a component leaves the configuration, the search component 204 can locate potential sources of binding information (e.g., a node of a distributed directory). Locations that are traditionally sources of information relevant to binding can be retained for later usage. In addition, the search component 204 can evaluate potential information sources to deem if they include relevant information and/or are likely to hold relevant information.

Locations deemed relevant by the search component 204 as well as other locations can have information accessed by an obtainment component 206. The obtainment component 206 can gather information from various locations, including current bindings, bindings no longer acceptable (e.g., bindings that have lost a controller), capabilities of controllers, and the like. Filtered gathering can be practiced, such that only information likely to be relevant is collected, information from more reliable sources is gathered first, a limited amount of data (e.g., based upon storage size) is collect, as well as other filtering criteria.

An analysis component 208 can evaluate metadata related to the identified change, a result of the evaluation is used to select an alternative binding and determine a manner for changing the binding (e.g., determining the alternative binding). Different tests can be run by the analysis component 208 to compare different controllers. For example, a new controller can be added to the configuration and the analysis component 208 can compare capabilities of the new controller against existing configuration controllers and develop a possible binding to take advantage of respective capabilities. The analysis component 208 can operate as means for evaluating the industrial control configuration regarding impact to the industrial control configuration upon addition of a component to the industrial control configuration.

The system 200 can use a choice component 210 that selects the at least one binding to alter and determines a manner used by a modification component 104 to alter the at least one binding. For instance, the choice component 210 can process a result of the comparison of the analysis component 208. Based upon the result, the choice component 210 can determine if a binding should be moved from an existing controller to a new controller. The choice component 210 can function as means for determining a manner in which to modify at least one binding of the industrial control configuration based upon the addition of the component. In addition, the obtainment component 206 can function such that it selectively collects the metadata used by the choice component 210 and/or the analysis component 208. Different pieces of information, such as collected metadata, component operating instructions (e.g., communication component 202), source location, components themselves, etc. can be held on storage 212. Storage 212 can arrange in a number of different configurations, including as random access memory, battery-backed memory, Flash memory, hard disk, magnetic tape, etc. Various features can be implemented upon storage 212, such as compression and automatic back up (e.g., use of a RAID configuration). In addition, storage 212 can operate as memory that can be operatively coupled to a processor (not shown) and can implement as a different memory form than an operational memory form. Storage 212 can implement as a storage component and house collected metadata (e.g., metadata collected from the obtainment component 206). A computer program embodied upon a computer-readable medium (e.g., storage 212) can be used that includes program code for identifying removal of a portion of an industrial control configuration and program code for modifying at least one binding of the industrial control configuration based upon lost functionality from the removal. Furthermore, the system 200 can include a modification component that alters at least one binding.

Figure 3:
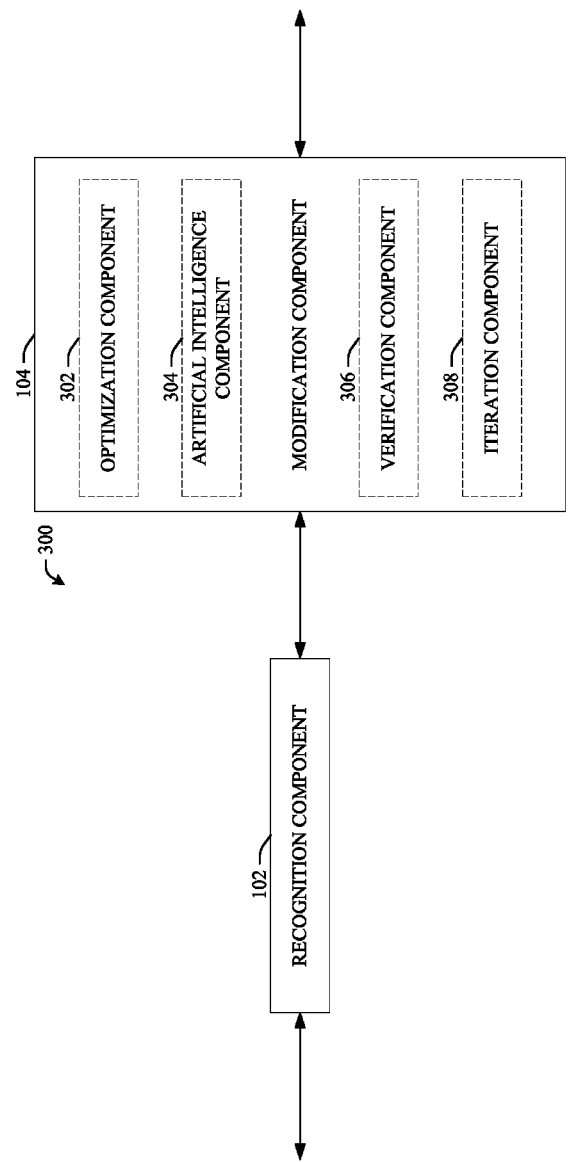
FIG. 3 illustrates a representative system for automatic binding adaptation in accordance disclosing a detailed modification component in accordance with an aspect of the subject specification.

Now referring to FIG. 3, an example system 300 is disclosed for altering a binding in a configuration with a detailed modification component 104. The system 300 can use a recognition component 102 that identifies a change in the industrial control configuration. The recognition component 102 can implement as means for recognizing the addition of the component to the industrial control configuration. The modification component 104 can be employed to automatically alter at least one binding based upon the identified change. The modification component 104 can function as means for automatically modifying the binding through the determined manner, modifying the binding includes deleting the binding, creating the binding, adjusting the binding, or a combination thereof.

An optimization component 302 can function to improve bindings of the configuration. The choice component 210 of FIG. 2 can select bindings that can be placed in the configuration. However, there can be times when equal bindings can be used (e.g., one binding is not better than another) and a decision should be made on which binding to use. In addition, times when a binding that should be used can be ambiguous. For example, there can be a desire for a controller to bind with a directory node when two nodes are available; binding with a first node can allow for quicker performance while another node can be considered more stable and less likely to leave the configuration. The optimization component 302 can determine which binding should be used (e.g., determining a binding for deletion) based upon created differences or determine if both bindings should exist.

Thus, the optimization component 302 and the choice component 210 of FIG. 2 can work together select a binding. For example, the choice component 210 can select a plurality of different bindings for placement based upon a change. However, the selection of the bindings by the choice component 210 of FIG. 2 can be detrimental as a whole (e.g., slow operation) and the optimization component 302 can change the bindings for implementation to improve performance, reduce storage space consumed, and the like. According to an alternative embodiment, the choice component 210 of FIG. 2 can determine that certain functionality should occur and determine bindings that should be used to achieve the functionality. The optimization component 302 can evaluate available bindings and select at least one binding to implement upon the configuration.

An artificial intelligence component 304 can be used to facilitate determinations of the system 300. It is to be appreciated that artificial intelligence techniques can be used to practice determinations and inferences disclosed in the subject specification. The artificial intelligence component 304 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 304 can also include methods for capture of logical relationships such as theorem provers or more heuristic rule-based expert systems. The artificial intelligence component 304 can be represented as an externally pluggable component, in some cases designed by a disparate (third) party.

Once bindings are in place, it is possible that operation does not occur as anticipated. For example, placement of multiple bindings upon one controller can cause performance issues greater than expected (e.g., a processor is not equipped to handle reliance by multiple controllers). Therefore, a verification component 306 can perform a check to ensure that alterations made are as desired. If the check produces a negative outcome, then an iteration component 308 can operate.

It can be possible that the modification component 104 should run multiple times due to one change, which can be facilitated by an iteration component 308. For example, the modification can alter a binding based on the change. However, due to the change in a binding, other bindings can be impacted (e.g., supplemental bindings). For instance, 'controller a' and 'controller b' can bind together and 'controller b' and 'controller c' can bind together. Based on these bindings, 'controller c' can access information of 'controller a'. If the binding between 'controller a' and 'controller b' is eliminated, then 'controller c' can be without necessary information (e.g., from 'controller a') and an iteration should occur to allow 'controller c' to access 'controller a'.

Therefore, the modification component 104 can run again to change the dependent bindings. The verification component 306 can perform a check upon the industrial control configuration after the modification component 104 alters the at least one binding to determine if a supplemental binding is at least partially erroneous. If there is a determination that the supplemental binding is at least partially erroneous, then the modification component 104 can operate upon the supplemental binding.

Moreover, it is to be appreciated that the industrial control configuration can a distributed control configuration without reliance upon a central database (e.g., propagated upon multiple nodes without a central location, such as with a distributed directory). Thus, the distributed control configuration uses at least one managed tool and at least one unmanaged tool. According to one embodiment, the supplemental binding that is at least partially erroneous includes when the supplemental binding is in failure according to at least one aspect, when the supplemental binding is no longer optimal, when the supplemental binding becomes unnecessary, or a combination thereof. The verification component 306 or modification component 104 can repeat operation until there is not an at least partially erroneous supplemental binding of the industrial control configuration.

Figure 4:
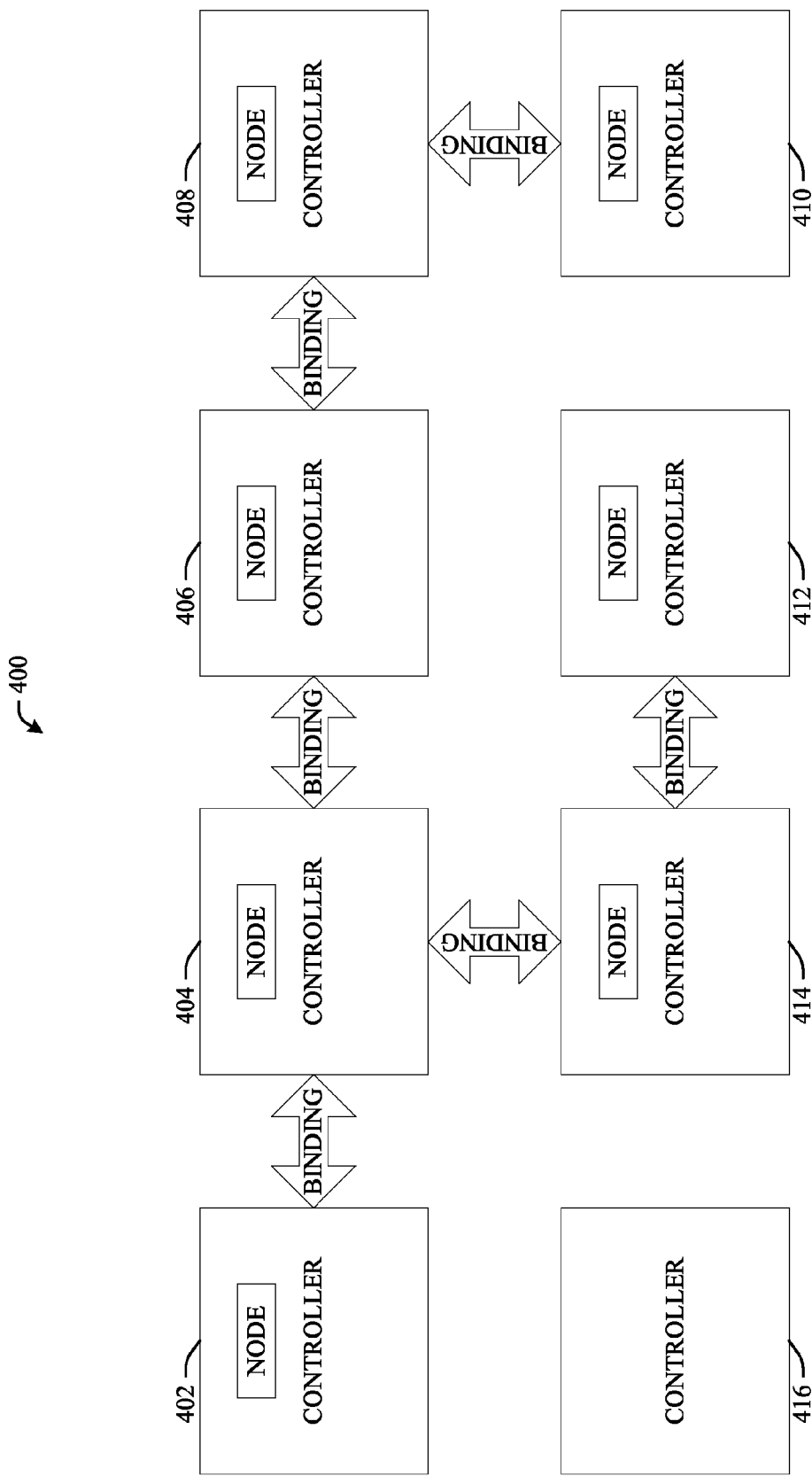
FIG. 4 illustrates a representative industrial control configuration in accordance with an aspect of the subject specification.

Now referring to FIG. 4, an example industrial control configuration 400 is disclosed, where a number of controllers are disclosed that can be part of an industrial control configuration. The controllers 402, 404, 406, 408, 410, 412, and 414 can communicate with one another and share information through different bindings. In addition, these controllers can retain a node of a distributed directory, which can provide information about other controllers (e.g., addresses, capabilities, and the like). The following examples can provide insight as to implementation of aspects disclosed herein.

In one example, controller 416 can be added to the configuration, which is identified by the recognition component 102 of FIG. 1. If controller 416 has similar functionality to controller 404, then it can be advantageous for at least a part of a load carried by controller 404 to be alleviated, since controller 404 has three bindings. A determination can be made on what binding(s) of controller 404 should be deleted in lieu of binding with controller 416. For example, if the binding between 404 and 406 (abbreviated as 404-406) is erased, then multiple supplemental bindings can be impacted—therefore, a determination can be made that the 404-406 binding should remain intact. However, creating a 402-416 binding and a 414-416 binding and deleting the 414-404 binding can have little impact on the configuration 400 and be desirable to use; thus, the modification component 104 of FIG. 1 can made appropriate alteration.

In another example, controller 414 can be removed from the configuration, which is identified by the recognition component 102 of FIG. 1 and therefore controller 412 is left unconnected with other controllers. A check can be made if the controller 412 should bind with another controller. If the check results such that access to the same controllers is appropriate, then it can be determined that a new binding should be created. The optimization component 302 of FIG. 3 can be employed to determine a binding to create. For example, while binding with controller 406 can allow a shortest degree of separation (e.g., a two binding connection minimum), this connection could overburden controller 406. However, other new bindings can create multiple degrees of separation. It is to be appreciated that multiple bindings can be created, such as 402-412 and 410-412 which can balance separation with binding load.

In yet another example, a binding between controller 408 and controller 410 can fail, which is identified by the recognition component 102 of FIG. 1. A similar balancing can occur to determine a controller to bind with controller 410 if appropriate. Additionally, a determination can be made if at least one additional binding should be placed upon controller 408. While bindings are disclosed connected at least two controllers, it is to be appreciated that other entities can also be used (e.g., servers).

Figure 5:
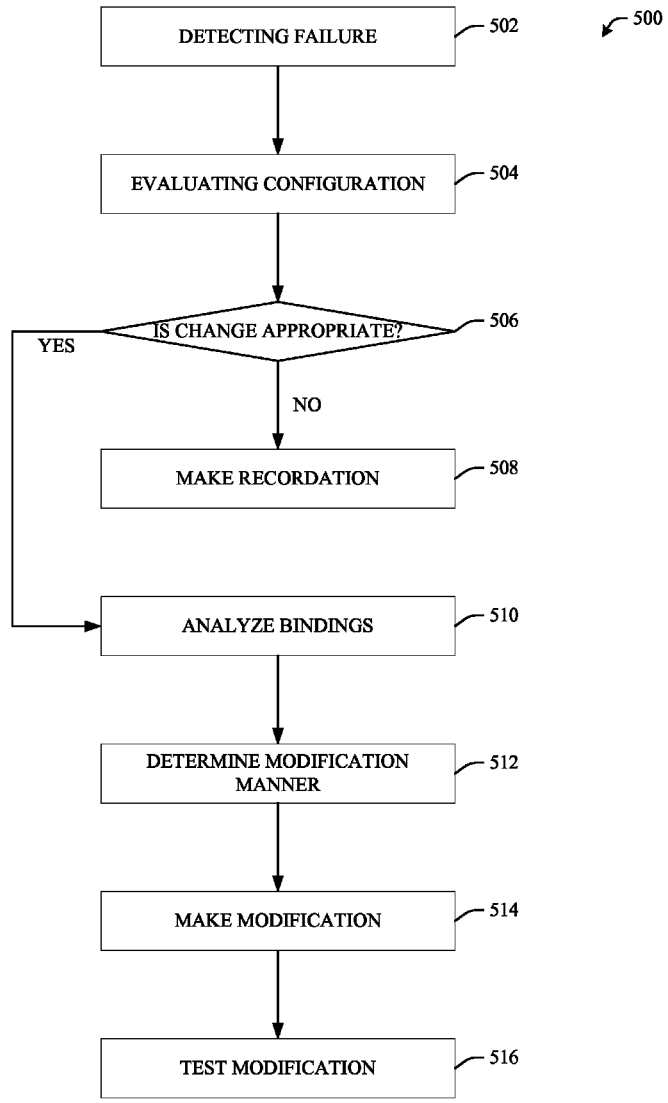
FIG. 5 illustrates a representative methodology for managing failure in an industrial control configuration in accordance with an aspect of the subject specification.

Now referring to FIG. 5, an example methodology 500 is disclosed for managing bindings when a failure occurs in an industrial control configuration. A failure can occur in the configuration and this failure can be detected at action 502. Action 502 can represent detecting a failure related to a binding of the industrial control configuration. According to one embodiment, the industrial control configuration is a distributed control configuration without reliance upon a central database (e.g., uses a distributed directory).

Analysis of the configuration can occur at action 504—this can take place continuously as well as upon detecting the failure. Specifically, checks can be made on what bindings and/or controllers are impacted (e.g., directly or indirectly) from the failure. Requests can be made to various entities for history of bindings, such that bindings that were infrequently used can be deemed excessive and thus do not need to be replicated.

A check 506 can be made to determine if an alteration to the configuration (e.g., a modification to bindings) is appropriate. If it is determined that a modification is not appropriate, the metadata related to the configuration, failure, check, and the like can be retained in storage at action 508. Upon other iterations of action 504, this recorded history can be analyzed to determine if an alteration is appropriate.

If the check 506 determines that it is appropriate to alter bindings, then existing bindings can be evaluated at action 510. Based upon a result of the binding evaluation, a determination can be made as to what modification should occur (e.g., bindings that should be added, removed, and the like). In addition, how modification should occur can also be determined at action 512, such as what order operations should take place (e.g., an order for binding creation), how and when to take controllers offline if appropriate, when to update a directory node of the change, and the like.

At action 514, there can be making an automatic adjustment to the at least one binding of the industrial control configuration to mitigate impact of the failure. According to one embodiment, the failure is a component of the industrial control configuration does not operate as desired and the automatic adjustment is modifying the binding. Moreover, the methodology 500 can configure such that modifying the binding includes deleting the binding, creating the binding, adjusting the binding, or a combination thereof. The modification can be tested at action 516 to determine if an error occurs and appropriate correction can take place.

Figure 6:
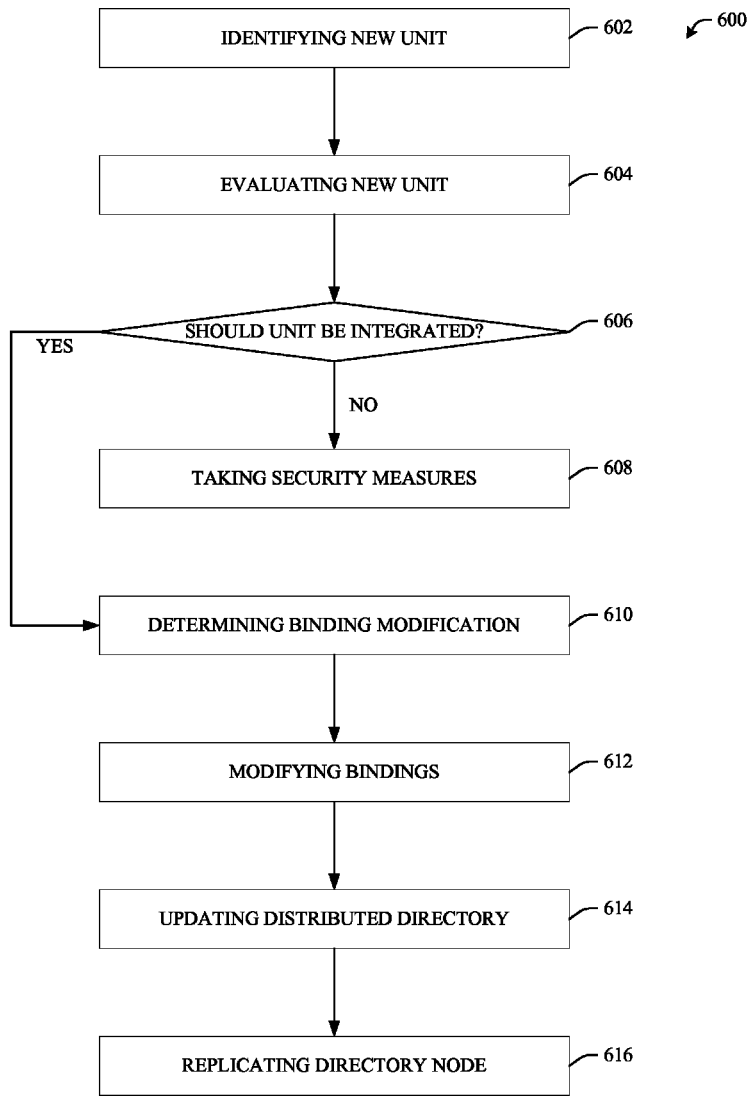
FIG. 6 illustrates a representative methodology for managing a new unit entered upon an industrial control configuration in accordance with an aspect of the subject specification.

Now referring to FIG. 6, an example methodology 600 is disclosed for managing bindings with regard to placement of a new unit upon a configuration. At action 602, there can be identification of a unit being added. In addition, metadata pertaining to the unit can be collected, such as physical and logical location, capabilities, prior operational history, and the like.

The new unit can be evaluated at action 604, including comparing capabilities of the new unit against capabilities of units that exist in the configuration through other units. A check 606 can be performed to determine if the unit should be integrated with the configuration. It is possible that addition of a new unit to a configuration can cause an undesirable security risk. For example, controllers can include proprietary information that should have limited disclosed. A test of the new unit can occur to determine if the unit should become part of the configuration, if bindings should be altered based on security, and the like. If the check concludes that the new unit should not function with the configuration (e.g., bind), then security measures can be taken at action 608. Security measures can include encrypting information, limiting access of the new unit, performing further verifications to determine if communication should be engaged with the new unit, and the like.

If the check 606 determines that integration should occur, then a determination can be made as to what bindings should be altered at action 610. The determination can occur in order to maximize efficiency of the configuration, create a more stable environment, etc. Based upon the determination, a binding alteration can occur at action 612. According to one embodiment, new bindings can be created and a test can be performed to determine if other bindings or new bindings are redundant and thus should be deleted.

As bindings change, information retained in a directory of the configuration (e.g., a distributed directory) can become outdated, which can become problematic if relied upon by an entity. Therefore, the directory can be updated through action 614 and verification can occur to ensure vital information is not accidentally replaced. Moreover, a determination can be made as to when updating should occur (e.g., upon binding creation, upon verification, etc.) and a result of the determination can be followed. If the directory is a distributed directory, then multiple nodes can exist upon which an entity can rely. Therefore, at action 616 there can be propagation of the update upon at least one other node of the directory.

Figure 7:
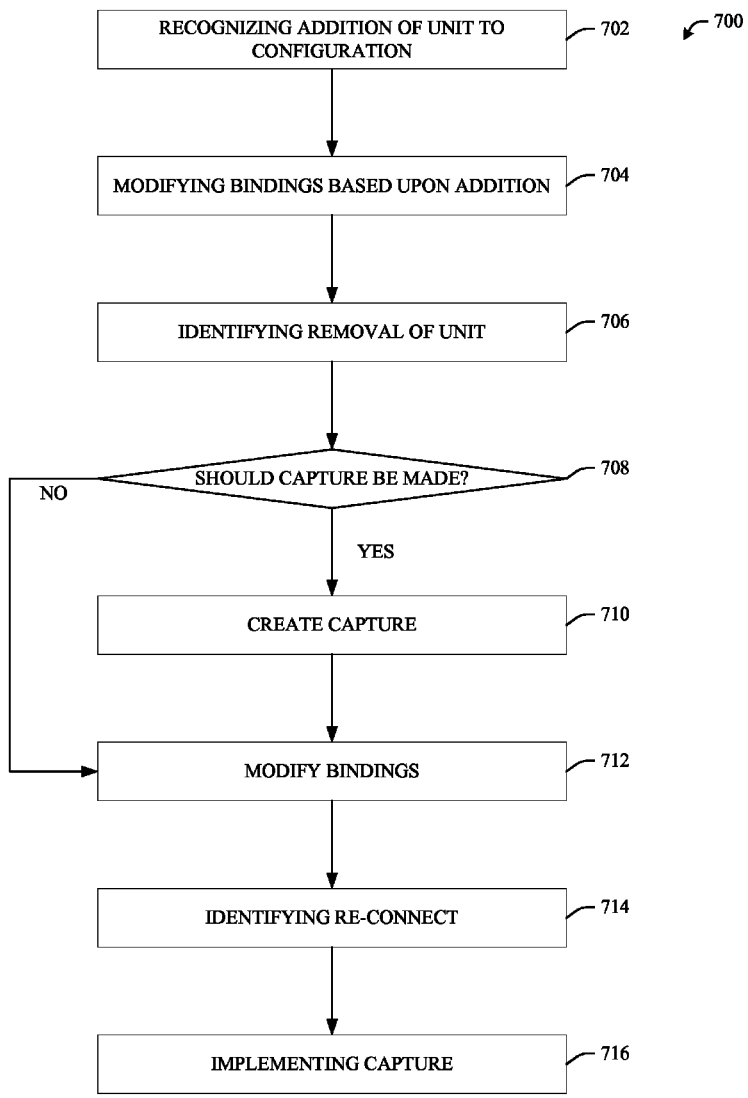
FIG. 7 illustrates a representative methodology for managing multiple changes for an industrial control configuration in accordance with an aspect of the subject specification.

Now referring to FIG. 7, an example methodology 700 is disclosed for improving performance upon an industrial control configuration regarding binding placement. Addition of a unit to the configuration can be recognized at action 702. According to one embodiment, recognition of the new unit can include the new unit sending a request to relevant entities (e.g., controllers) requesting information.

Based upon the addition, bindings of the configuration can be altered at action 704. The configuration can operate with the bindings until the added unit (or other component) is removed at action 706. A check 708 can determine if a capture should be made, where a capture is a recording of where bindings are placed (e.g., at a moment in time). The determination can be based upon a likelihood of a removed unit returning and status of the return (e.g., distance in time, likelihood of other components moving and thus changing complexity, etc.).

If it is determined that a capture should be made, then the capture can be taken at action 710. The capture can be complete (e.g., identify all bindings of the configuration) as well as partial (e.g., identify bindings relevant to a moved entity). While disclosed as being taken after removal, it is to be appreciated that a capture can be taken periodically and saved-over except for when a removal occurs, such that if a component is removed a capture already exists.

Regardless of if a capture is taken, bindings can be modified in accordance with the removal at action 712. The configuration can operate and at a later time the removed unit can be re-connected with the configuration, which can be identified at action 714. It is possible that other additions, removals, failures, etc. occur between removal and re-connection. If the capture was taken at action 710, then a determination can be made if the capture should be implemented, at least in part (e.g., former bindings should be revived). If the determination has a positive result, then at least a portion of the capture can be implemented at action 716.

While the methodology 700 is disclosed for an added entity that is removed and then added again, it is to be appreciated that other implementations can be practiced. For example, similar circumstances can arise when a failure occurs. A pre-failure state can be analyzed and appropriate metadata retained. When the failure is corrected, the configuration can return to a pre-failure state (e.g., old bindings can be re-created).

Figure 8:
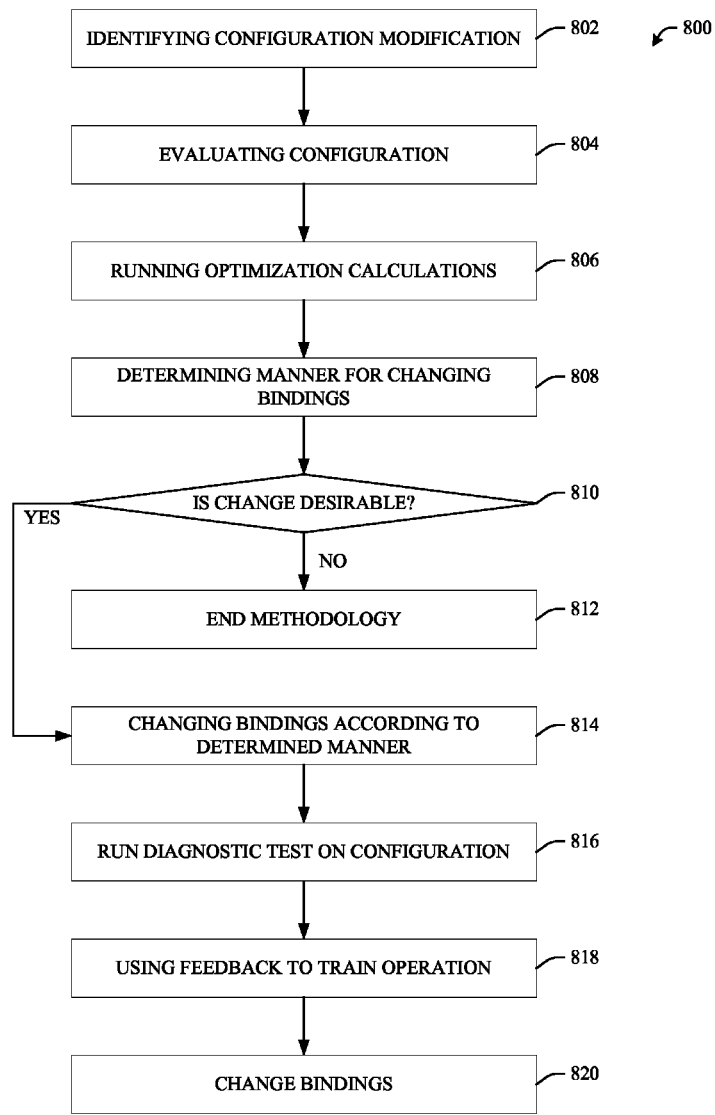
FIG. 8 illustrates a representative methodology for using feedback to improve operation of an adaptive binding configuration in accordance with an aspect of the subject specification.

Now referring to FIG. 8, an example methodology 800 is disclosed for improving operation in an industrial control configuration. A configuration modification (e.g., component removal, addition, etc.) can be identified at action 802. Relevant information to the modification can be collected and the modification can be analyzed (e.g., why the modification occurs, how the modification influences units, and the like) through action 804.

Based upon a result of the analysis, optimization calculations can be run upon the configuration at action 806. The optimization calculations can be used to determine a manner for alteration of bindings based upon the configuration modification, which can occur at action 808. A check 810 can occur to determine if bindings should be changed. For example, if a system associated with the methodology 800 is running a critical process, then it can be determined that the change should not occur and the methodology terminate at action 812. However, other implementations are possible, such as monitoring the critical process to determine when complete and moving forward with binding change at that time. Based upon the determined manner, bindings of the configuration can be changed accordingly at action 814.

With at least a portion of the bindings changed, a diagnostic check can be run to determine if errors occur with regard to the bindings at action 816. A result of the diagnostic test can be used to train operation of binding modification (e.g., training a decision network employing artificial intelligence techniques that is used to determine how bindings should be modified) with action 818. For example, if multiple times a controller fails when the controller received a certain number of bindings, then operation can be altered such that the controller is limited in bindings placed (e.g., in order to avoid a failure). Based upon the altered operation, bindings can be appropriately modified through action 820.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
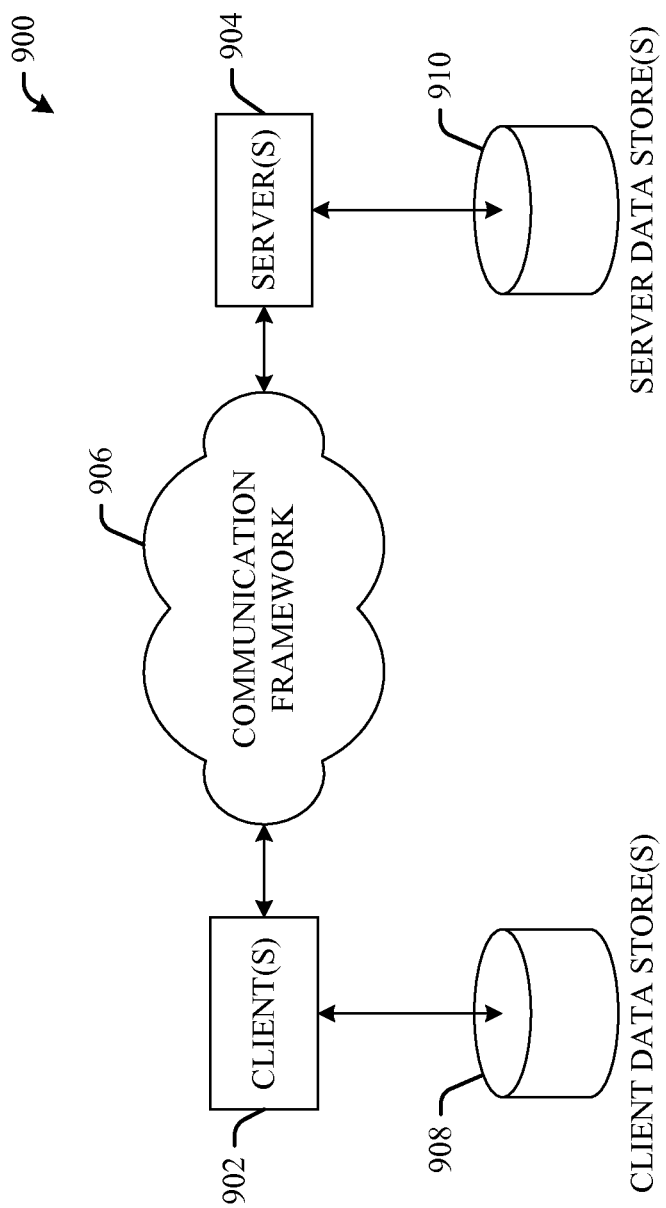
FIG. 9 illustrates an example of a schematic block diagram of a computing environment in accordance with an aspect subject specification.
Figure 10:
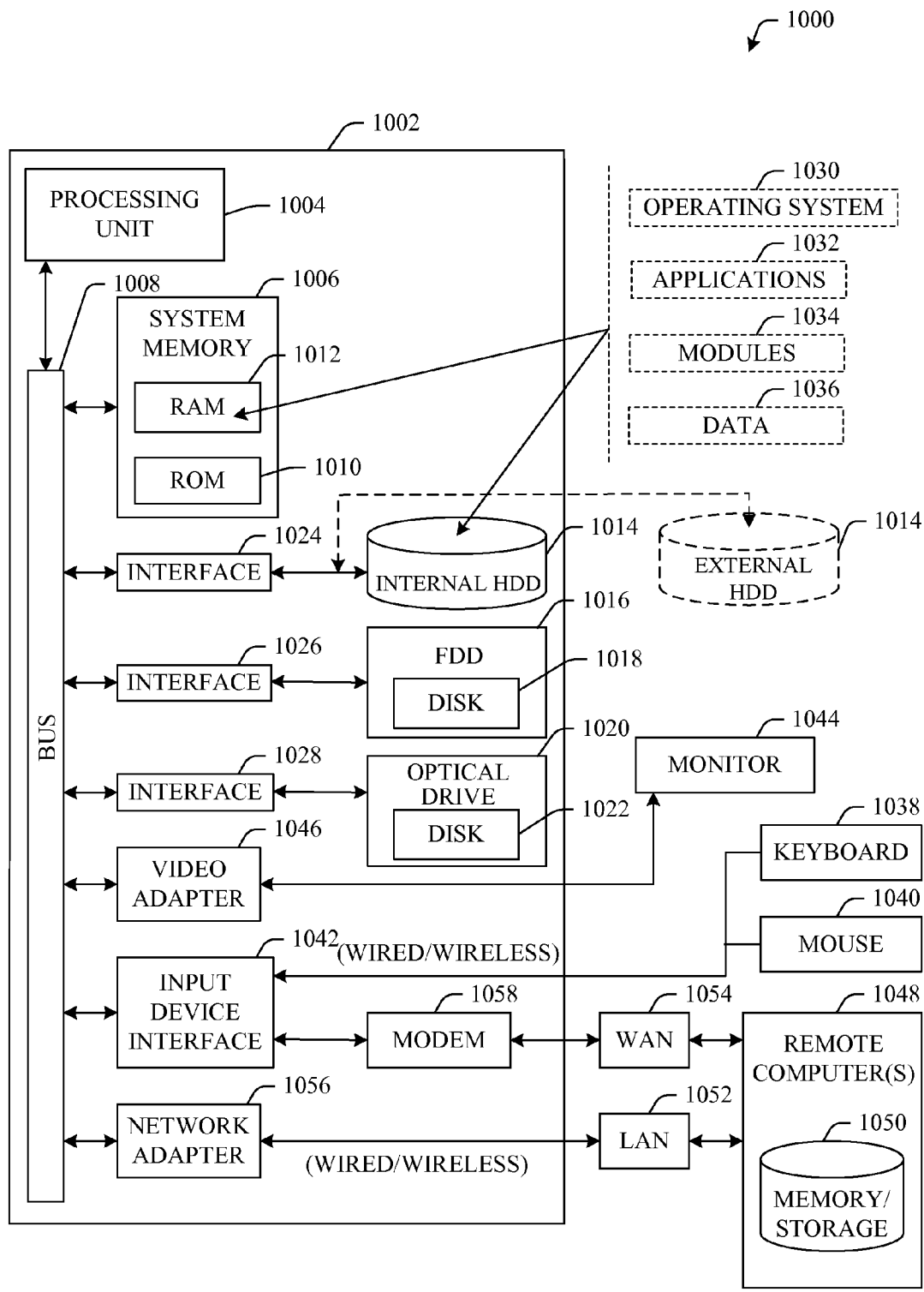
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory that stores computer-executable instructions; and
a processor, coupled to the memory, that facilitates execution of the computer-executable instructions to at least:
detect a change with regard to an industrial controller utilized in connection with an industrial process;
in response to the change, alter a binding of the industrial controller to a component of the industrial process based on the change; and
check for an error in a supplemental binding related to the binding.

2. The system of claim 1, wherein the processor further facilitates the execution of the computer-executable instructions to:
evaluate metadata related to the change; and
select the binding based on the metadata.

3. The system of claim 1, wherein the supplemental binding depends on the binding.

4. The system of claim 1, wherein the processor further facilitates the execution of the computer-executable instructions to:
correct the error in the supplemental binding in response to a determination that the error exists in the supplemental binding.

5. A computer-readable storage device having stored thereon computer-executable instructions that, in response to execution, cause a computing system including a processor to perform operations, the operations comprising:
identifying a failure of a binding between an industrial controller and an industrial component utilized in connection with an industrial process;
making a modification to the binding based on the failure; and
testing the modification for a second failure related to a supplemental binding that depends from the binding.

6. The computer-readable storage device of claim 5, wherein the operations further comprise:
evaluating metadata related to the failure; and
selecting the binding based on the metadata.

7. The computer-readable storage device of claim 6, wherein the operations further comprise:
retrieving the metadata from at least two locations.

8. The computer-readable storage device of claim 5, wherein the operations further comprise:
correcting the second failure in response to the testing indicating that the second failure is to be corrected.

9. The computer-readable storage device of claim 5, wherein the operations further comprise:
mitigating an impact of the second failure in response to the testing indicating that the second failure is to be corrected.

10. The computer-readable storage device of claim 5, wherein the identifying further comprises detecting an addition of the industrial controller, a removal of the industrial controller, a failure of the industrial controller, or an adjustment of an operation of the industrial controller.

11. The computer-readable storage device of claim 5, wherein the making further comprises deleting the binding.

12. A method, comprising:
detecting, by a system including a processor, a change with regard to an industrial controller utilized in connection with an industrial process;
in response to the detecting the change, modifying, by the system, a binding of the industrial controller to a component of the industrial process; and
checking, by the system, for a fault in a supplemental binding that depends from the binding.

13. The method of claim 12, further comprising:
evaluating, by the system, metadata related to the change; and
selecting, by the system, the binding based on the metadata.

14. The method of claim 13, further comprising:
retrieving, by the system, the metadata from at least two locations.

15. The method of claim 12, further comprising:
correcting, by the system, the fault in response to the checking indicating that the fault is present.

16. The method of claim 12, further comprising:
mitigating, by the system, an impact of the fault in response to the checking indicating that the fault is present.

17. The method of claim 12, wherein the detecting further comprises detecting an addition of the industrial controller, a removal of the industrial controller, a failure of the industrial controller, or an adjustment of an operation of the industrial controller.

18. The method of claim 12, wherein the modifying further comprises deleting the binding.

19. The method of claim 12, wherein the modifying further comprises adjusting the binding.

20. The method of claim 12, wherein the modifying further comprises creating the binding.

* * * * *